Patented Jan. 16, 1923.

1,442,218

UNITED STATES PATENT OFFICE.

ERNEST HOPKINSON, OF NEW YORK, N. Y.

RUBBER BALE.

No Drawing.   Application filed January 20, 1922.   Serial No. 530,733.

*To all whom it may concern:*

Be it known that I, ERNEST HOPKINSON, a citizen of the United States, residing in New York city, county of New York, and State of New York, have invented certain new and useful Improvements in Rubber Bales, of which the following is a full, clear, and exact description.

This invention concerns the manufacture of crude rubber and more particularly bales thereof for shipment overseas.

It is the commercial practice today to ship bales of crude rubber in wooden boxes or burlap. These afford protection against foreign matter but not as complete as desirable, only imperfectly preventing oxidation or absorption of deleterious substances, like oil and water. And the box container or burlap does not preserve the bale during transit from loss by evaporation or exudation of any of its nitrogenous, hydrous, or other desirable constituents likely to escape.

The present invention aims to provide a bale that is protected and preserved more perfectly; and that may be prepared for shipment inexpensively.

With the preferred embodiment in mind and without intention to limit more than is required by the prior art, the invention may be said to consist in a "case-hardened" rubber bale rendered insensible to the ordinary external conditions encountered by a superficial protecting coat or skin.

According to my invention, a block of rubber is treated with a weak solution of bromine in carbon tetrachloride. Treatment may be effected, after the bale is compressed but before shipment, in any suitable and convenient manner as, for instance, by brushing or by dipping; immersion in approximately a 3% solution for a fraction of a minute followed by evaporation of the solvent at normal or elevated temperature being preferred.

The product is a "case-hardened" bale. Externally, its surface is hardened and toughened so that the bale may be slid around with facility and impunity. The indurated surface or skin of the bale is superficial, extending only a slight depth into the bale, into the body of which it blends without presenting a distinct line of cleavage or demarkation. And being blended into and integral with the body of the bale, the brominated skin forms a durable non-cracking sheath protecting and preserving the crude rubber until arrival and use at the factory. The brominated skin is also resistant to acids, alkalies and oils, to the passage of water into, or out of, the bale, and is relatively strong, flexible and free from tackiness.

Although not as desirable, but in a degree with the same effect, chlorine, iodine and sulphur monochloride may be used in a suitably weak solution. The strength of the solution may be varied to increase or diminish the intensity of the action and the depth of penetration, but, as above indicated, an approximately 3% solution in the case of bromine has been found satisfactory.

With measurable satisfaction also, the objects of the invention may be realized by coating a bale with shellac or varnish containing an agent increasing the flexibility thereof, such as glycerine. Dressing with nitrocellulose is also contemplated. And a superficial vulcanization with sulphur chloride or with cold curatives may be employed to produce a protecting skin with or without the above mentioned halogenating treatment.

The "case-hardened" bale of the present invention with its protecting and preserving skin, relatively hard and slippery, may be shipped from the source of supply, plantation or forest, to the manufacturer overseas without necessarily wrapping it in burlap or boxing it, and without fear of its picking up mechanical impurities, such as sand and dirt, or absorbing deleterious matter, such as oil. Furthermore, the superficially indurated bale is relatively impermeable and prevents to a substantial degree either the absorption or evaporation of moisture or its hydrous constituents, respectively. Thus, the bale may be transported to a distant user in substantially the condition originally compacted. Still further, the proportion of hardened skin to the total mass of the bale—the commercial bale weighing about 150 lbs.—is so small as to be a negligible consideration for the manufacturer in compounding the crude rubber with other substances for the production of many, if not all, articles.

It is to be understood that the invention is not to be limited to the precise disclosure in the foregoing and contemplates any and all alternatives not departing from the underlying principles, the form and shape of the bale, for instance, being obviously immaterial, and variable to suit any requirements not incompatible with external protective surfacing.

The bales are ordinarily made of crude rubber derived from latex by coagulation with smoke or acid. This invention contemplates crude rubber however derived, including, for instance, that obtained by comminuting and directly drying the latex. In some cases, it is desirable to ship the crude rubber with incorporated preservative or beneficial agents, and sometimes also curatives or vulcanizing agents. In the claims, the term "unvulcanized rubber" is employed to comprehend any kind of crude rubber containing any, all, or none, of the above mentioned types of agents.

Having thus described my invention, what I claim and desire to protect by Letters Patent is:

1. As an article of manufacture, a bale of unvulcanized rubber having an artificial thin protecting skin.

2. As an article of manufacture, a superficially indurated bale of unvulcanized rubber.

3. As an article of manufacture, a bale of unvulcanized rubber having a hardened and slippery skin.

4. As an article of manufacture, a bale of unvulcanized rubber having a halogenous skin.

5. As an article of manufacture, a bale of unvulcanized rubber having a brominated skin.

6. As an article of manufacture, a bale of rubber having an integral artificial protecting skin of a character and thickness negligible in proportion to the remainder for compounding.

Signed at New York city, New York, this 18th day of January, 1922.

ERNEST HOPKINSON.